(12) United States Patent
Kwon et al.

(10) Patent No.: US 12,479,315 B2
(45) Date of Patent: Nov. 25, 2025

(54) METHOD OF CONTROLLING ADD-ON MOBILITY

(71) Applicants: Hyundai Motor Company, Seoul (KR); Kia Corporation, Seoul (KR)

(72) Inventors: Hyuk Joon Kwon, Suwon-si (KR); Buhm Joo Suh, Hwaseong-si (KR); Woul Sun Choi, Hwaseong-si (KR); Seung Wook Lee, Gwangmyeong-si (KR); Tal Chol Kim, Bucheon-si (KR); Yeong Il Choi, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 342 days.

(21) Appl. No.: 18/303,039

(22) Filed: Apr. 19, 2023

(65) Prior Publication Data

US 2024/0123837 A1 Apr. 18, 2024

(30) Foreign Application Priority Data

Oct. 18, 2022 (KR) .................. 10-2022-0134243

(51) Int. Cl.
*B60L 15/20* (2006.01)
*B60L 7/26* (2006.01)

(52) U.S. Cl.
CPC ............. *B60L 15/2045* (2013.01); *B60L 7/26* (2013.01); *B60L 2200/28* (2013.01); *B60L 2240/423* (2013.01); *B60L 2240/547* (2013.01)

(58) Field of Classification Search
None
See application file for complete search history.

(56) References Cited

U.S. PATENT DOCUMENTS

| | | | |
|---|---|---|---|
| 11,945,530 B2* | 4/2024 | Yang | B60L 15/2009 |
| 2013/0079980 A1* | 3/2013 | Vuk | B62D 59/04 |
| | | | 701/36 |
| 2023/0311873 A1* | 10/2023 | Bolf | B60D 1/62 |
| | | | 701/23 |

FOREIGN PATENT DOCUMENTS

KR 102204715 B1 1/2021

* cited by examiner

*Primary Examiner* — Justin S Lee
(74) *Attorney, Agent, or Firm* — Slater Matsil, LLP

(57) ABSTRACT

A method of controlling an add-on mobility includes measuring a force in a front-rear direction between a main body vehicle and the add-on mobility by a force sensor connecting the main body vehicle and the add-on mobility and controlling a driving force and a braking force of the add-on mobility according to a magnitude of the force in the front-rear direction measured by the force sensor.

20 Claims, 6 Drawing Sheets compression (+) ← 0 → tensile (−)

FIG. 6

| | | add-on mobility | |
|---|---|---|---|
| main body vehicle | in excess of first reference level | in excess of second reference level | second reference level or less |
| | | default mode | second change mode |
| | first reference level or less | first change mode | default mode |

METHOD OF CONTROLLING ADD-ON MOBILITY

CROSS-REFERENCE TO RELATED APPLICATIONS

The present application claims priority of Korean Patent Application No. 10-2022-0134243 filed on Oct. 18, 2022, the entire contents of which is incorporated herein for all purposes by this reference.

TECHNICAL FIELD

The present disclosure relates to a method of controlling an add-on mobility.

BACKGROUND

An add-on mobility refers to a conventional trailer connected to the rear of a vehicle or the like, and recently, the add-on mobility capable of self-driving by mounting its own power source has been developed.

The self-driving add-on mobility is provided with its own battery and motor and configured to drive driving wheels separately from a main body vehicle connected to the front and functioning as a tractor and is equipped with a braking device capable of mechanically braking the driving wheels or the like.

The matters explained as the background art are for the purpose of enhancing the understanding of the background of the present disclosure and should not be taken as acknowledging that they correspond to the related art already known to those skilled in the art.

SUMMARY

Embodiments of the present disclosure relates to a technology for controlling an add-on mobility capable of exerting its own driving force.

An embodiment of the present disclosure is directed to providing a method of controlling an add-on mobility, which allows a self-driving add-on mobility to perform close cooperative control with a main body vehicle with a relatively simple configuration and low cost and enables more improved energy management of a combination vehicle in which the main body vehicle and the add-on mobility are combined, thereby improving fuel efficiency or energy efficiency of the combination vehicle.

A method of controlling an add-on mobility for achieving the object includes measuring, by a controller, a force in a front-rear direction acting between a main body vehicle and the add-on mobility by a force sensor connecting the main body vehicle and the add-on mobility, and controlling, by the controller, a driving force and a braking force of the add-on mobility according to a magnitude of the force in the front-rear direction measured by the force sensor.

In the controlling of the driving force and the braking force of the add-on mobility, combinations in which a driving force of a motor mounted on the add-on mobility and a mechanical braking force of a braking device are provided may differently be configured according to a plurality of ranges classified according to the magnitude of the force in the front-rear direction measured by the force sensor.

The plurality of ranges may be classified into a compressive range in which a compressive force in a front-rear direction acts between the main body vehicle and the add-on mobility and a tensile range in which a tensile force in the front-rear direction acts between the main body vehicle and the add-on mobility. The compressive range may be divided into three ranges according to a magnitude of the compressive force and classified into a first range having the greatest compressive force, a third range having the smallest compressive force, and a second range connecting the first range and the third range. The tensile range may be divided into two ranges according to a magnitude of the tensile force and classified into a fourth range connected to the third range and having a relatively small tensile force and a fifth range connected to the fourth range.

In the controlling of the driving force and the braking force of the add-on mobility, when the magnitude of the force in the front-rear direction measured by the force sensor belongs to the first range, the mechanical braking force of the braking device may be controlled to be provided while maximally providing the regenerative braking force of the motor. When the magnitude of the force in the front-rear direction measured by the force sensor belongs to the second range, the regenerative braking force of the motor may be maximally controlled. When the magnitude of the force in the front-rear direction measured by the force sensor belongs to the third range, the regenerative braking force of the motor may be controlled according to the magnitude of the compressive force. When the magnitude of the force in the front-rear direction measured by the force sensor belongs to the fourth range, the driving force of the motor may be controlled according to the magnitude of the tensile force. When the magnitude of the force in the front-rear direction measured by the force sensor belongs to the fifth range, the driving force of the motor may be maximally controlled.

The controller may change ranges of at least some ranges among the first range to the fifth range according to the remaining fuel state of the main body vehicle and a state of charge (SOC) of a battery mounted on the add-on mobility.

The controller may reduce a range of the third range and extend a range of the fourth range by a level at which the range of the third range is reduced when the remaining fuel state of the main body vehicle is a low state of being a predetermined first reference level or less and the SOC of the battery mounted on the add-on mobility is a normal state in excess of a predetermined second reference level.

The controller may reduce a range of the fourth range and extend a range of the third range by a level at which the range of the fourth range is reduced when the remaining fuel state of the main body vehicle is a normal state in excess of a predetermined first reference level and the SOC of the battery mounted on the add-on mobility is a low state of being a predetermined second reference level or less.

The controller may drive the add-on mobility in different three modes according to the remaining fuel state of the main body vehicle and an SOC of a battery mounted on the add-on mobility.

The three modes may include a default mode in which the third range and the fourth range are classified at a point where the force in the front-rear direction acting between the main body vehicle and the add-on mobility is zero, a first change mode in which the third range is reduced in the default mode and the fourth range extends toward the third range by a level at which the third range is reduced, and a second change mode in which the fourth range is reduced in the default mode and the third range extends toward the fourth range by a level at which the fourth range is reduced.

The controller may control the add-on mobility in the default mode when the remaining fuel state of the main body vehicle is normal in excess of a predetermined first reference level and an SOC of a battery mounted on the add-on mobility is normal in excess of a predetermined second reference level.

The controller may control the add-on mobility in the first change mode when the remaining fuel state of the main body vehicle is a low state of being the first reference level or less and the SOC of the battery mounted on the add-on mobility is a normal state in excess of the second reference level.

The controller may control the add-on mobility in the second change mode when the remaining fuel state of the main body vehicle is a normal state in excess of the first reference level and the SOC of the battery mounted on the add-on mobility is a low state of being the second reference level or less.

The plurality of ranges may be consecutively connected, and the controller may change ranges of the plurality of ranges according to the remaining fuel state of the main body vehicle and the SOC of the battery mounted on the add-on mobility.

According to the present disclosure, it is possible to allow a self-driving add-on mobility to perform close cooperative control with a main body vehicle with a relatively simple configuration and low cost and enable more improved energy management of a combination vehicle in which the main body vehicle and the add-on mobility are combined, thereby improving fuel efficiency or energy efficiency of the combination vehicle.

BRIEF DESCRIPTION OF THE DRAWINGS

The above and other objects, features and other advantages of the present disclosure will be clearly understood from the following detailed description when taken in conjunction with the accompanying drawings, in which:

FIG. 6 shows modes for controlling the add-on mobility according to a remaining fuel state of the main body vehicle and a state of charge (SOC) of a battery mounted on the add-on mobility in the present disclosure.

DETAILED DESCRIPTION OF ILLUSTRATIVE EMBODIMENTS

Figure 1:
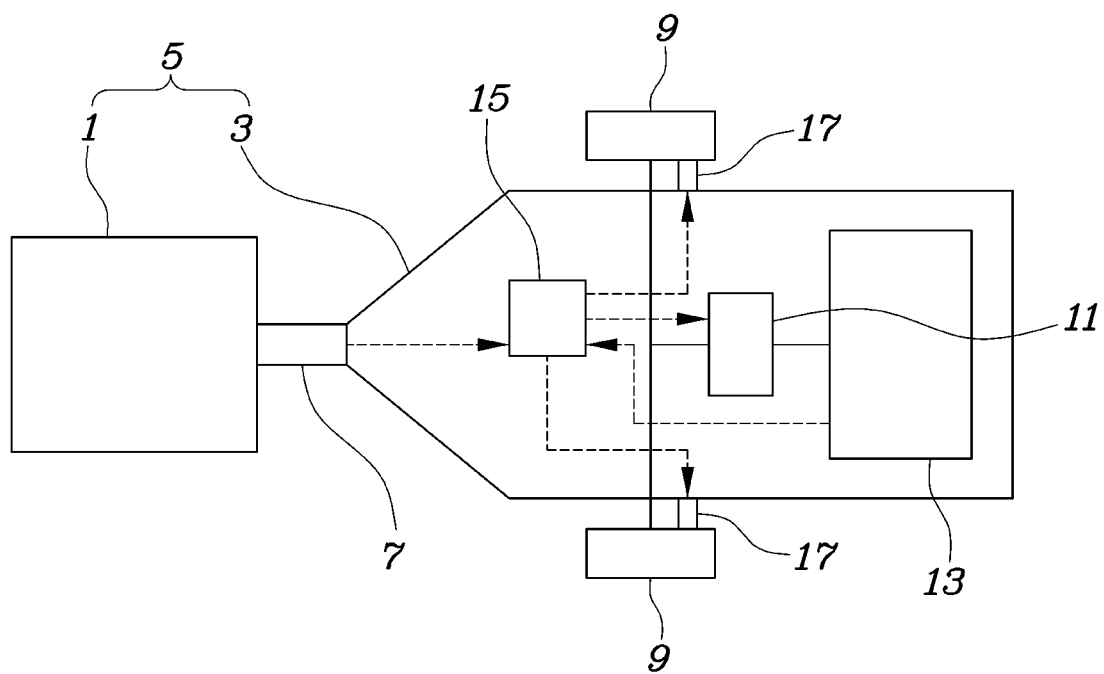
FIG. 1 shows a configuration of a main body vehicle and an add-on vehicle to which the present disclosure is applicable.

Hereinafter, an embodiment disclosed in the present specification will be described in detail with reference to the accompanying drawings, and the same or similar components are given the same reference numerals regardless of reference numerals, and overlapping descriptions thereof will be omitted.

The suffixes "module" and "unit" for components used in the following description are given or used interchangeably in consideration of only the ease of preparing the specification, and do not have distinct meanings or roles by themselves.

In describing the embodiment disclosed in the present specification, when it is determined that detailed descriptions of related known technologies may obscure the gist of the embodiment disclosed in the present specification, detailed descriptions thereof will be omitted. In addition, it should be understood that the accompanying drawings are only for easy understanding of the embodiment disclosed in the present specification, and the technical spirit disclosed herein is not limited by the accompanying drawings, and includes all changes, equivalents, or substitutes included in the spirit and technical scope of the present disclosure.

Terms including ordinal numbers such as first and second may be used to describe various components, but the components are not limited by the terms. The terms are used only for the purpose of distinguishing one component from another.

When a certain component is described as being "connected" or "coupled" to another component, it should be understood that it may also be directly connected or coupled to another component, but other components may be present therebetween. On the other hand, it should be understood that when a certain component is described as being "directly connected" or "directly coupled" to another component, other components are not present therebetween.

The singular expression includes the plural expression unless the context clearly dictates otherwise.

In the specification, it should be understood that terms such as "comprises" or "have" are intended to specify that the features, numbers, steps, operations, components, parts, or combinations thereof described in the specification are present, but do not preclude the possibility of the presence or addition of one or more other features, numbers, steps, operations, components, parts, or combinations thereof.

In addition, a unit or control unit included in the names of a motor control unit (MCU), a hybrid control unit (HCU), and the like is only the term widely used in the naming of a control device for controlling specific functions of a vehicle and does not mean a generic function unit.

The control unit may include a communication device for performing communication with other control units or sensors to control a function in charge, a memory for storing an operating system or logic commands and input/output information, and one or more processors for performing determination, calculation, decision, and the like necessary for controlling the function in charge.

Referring to FIG. 1, a combination vehicle 5 in which a main body vehicle 1 and an add-on mobility 3 are combined to which the present disclosure is applicable may measure a force acting in a front-rear direction between the main body vehicle 1 and the add-on mobility 3 because the main body vehicle 1 in the front and the add-on mobility 3 in the rear are connected by a force sensor 7.

As described above, the force sensor 7 may not only measure a front-rear directional force between the main body vehicle 1 and the add-on mobility 3 but also function as a medium for providing a front-rear directional operating force between the main body vehicle 1 and the add-on mobility 3, the medium for providing the front-rear operating force between the main body vehicle 1 and the add-on mobility 3 may be separately provided, and the force sensor 7 may also be mounted on the medium and may measure a force transmitted through the medium.

The add-on mobility 3 is equipped with a driving wheel 9, a motor 11 for driving the driving wheel 9, a battery 13 for storing electricity supplied to the motor 11, and a controller 15 for controlling the motor 11, and equipped with a braking device 17 provided to brake the driving wheel 9 with a mechanical braking force under the control of the controller 15 or the like.

The main body vehicle 1 may be an internal combustion engine vehicle, a hybrid electric vehicle, or an electric vehicle, and a "remaining fuel state of the main body vehicle" described in the present disclosure may become a state of charge (SOC) of a mounted battery in the electric vehicle, become the remaining amount of fuel of an internal combustion engine in internal combustion engine vehicle, and may be determined by appropriately combining the remaining amount of fuel of the mounted internal combustion engine and the SOC of the battery in the hybrid electric vehicle.

The controller 15 may be a subject for performing a control method of the present disclosure below and may receive information on the remaining fuel state of the main body vehicle 1 from the main body vehicle 1.

Referring to FIGS. 2 to 6, a method of controlling an add-on mobility according to an embodiment of the present disclosure includes an operation (S10) of measuring, by the controller 15, a front-rear directional force acting between the main body vehicle 1 and the add-on mobility 3 using the force sensor 7 connecting the main body vehicle 1 and the add-on mobility 3 and an operation (S20) of controlling, by the controller 15, a driving force and a braking force of the add-on mobility 3 according to a magnitude of a force in a front-rear direction measured by the force sensor 7.

In the operation (S2o) of controlling the driving force and braking force of the add-on mobility 3, a combination that provides a driving force and regenerative braking force of the motor 11 and a mechanical braking force of the braking device 17, which are mounted on the add-on mobility 3, is controlled to be differently configured according to a plurality of ranges divided according to the magnitude of the force in the front-rear direction measured by the force sensor 7.

Figure 4:
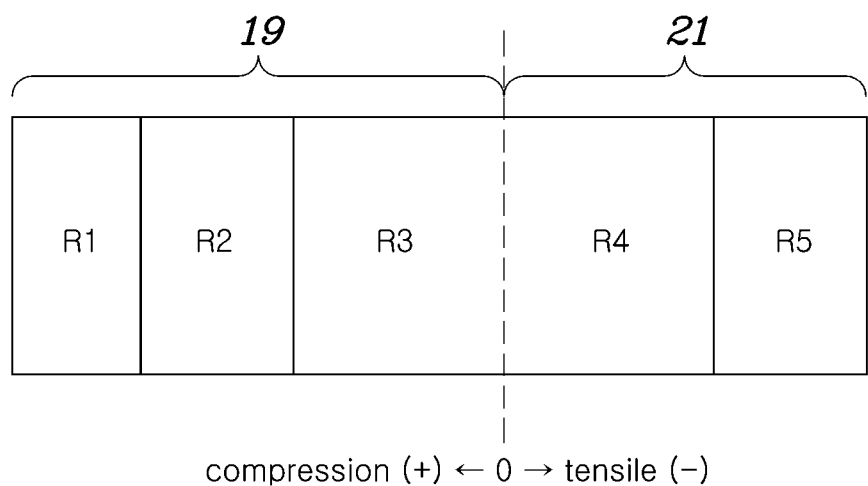
FIG. 4 shows a plurality of ranges divided according to a magnitude of a front-rear directional force measured by the force sensor in the present disclosure.

Since a direction in which a tensile force becomes (−) when a direction in which a compressive force acts is defined as (+) as shown in FIG. 4, the compressive force gradually increases when the main body vehicle 1 and the add-on mobility 3 come closer to each other and thus the magnitude of the force in the front-rear direction measured by the force sensor 7 further increases, and conversely, the compressive force gradually decreases and becomes zero when the main body vehicle 1 and the add-on mobility 3 are away from each other, and then the tensile gradually increases, and the gradual increase in the tensile force as described above is construed as the force in the front-rear direction measured by the force sensor 7 gradually decreases.

In other words, in the present disclosure, the motor 11 is controlled to provide a self-driving force of the add-on mobility 3 according to whether the force in the front-rear direction measured by the force sensor 7 between the main body vehicle 1 and the add-on mobility 3 is a compressive force or a tensile force and the magnitude of the force in the front-rear direction, or rather, an appropriate connection state between the main body vehicle 1 and the add-on mobility 3 can be maintained and the combination vehicle 5 can perform more improved energy management by generating a regenerative braking force to the motor 11 or additionally generating a mechanical braking force of the braking device 17, thereby improving fuel efficiency or energy efficiency of the combination vehicle 5.

In the embodiment, the plurality of ranges may basically be classified into a compressive range 19 in which a compressive force in the front-rear direction acts between the main body vehicle 1 and the add-on mobility 3 and a tensile range 21 in which the tensile force in the front-rear direction acts between the main body vehicle 1 and the add-on mobility 3.

As shown in FIG. 4, the compressive range 19 may be divided into three ranges according to the magnitude of the compressive force and classified into a first range R1 having the greatest compressive force, a third range R3 having the smallest compressive force, and a second range R2 connecting the first range R1 and the third range R3.

The tensile range 21 may be classified into two ranges according to the magnitude of the tensile force and classified into a fourth range R4 connected to the third range R3 and having a relatively small tensile force and a fifth range R5 connected to the fourth range R4.

In other words, as shown in FIG. 4, the plurality of ranges have the form in which the first to fifth ranges R1 to R5 are consecutively arranged.

Figure 3:
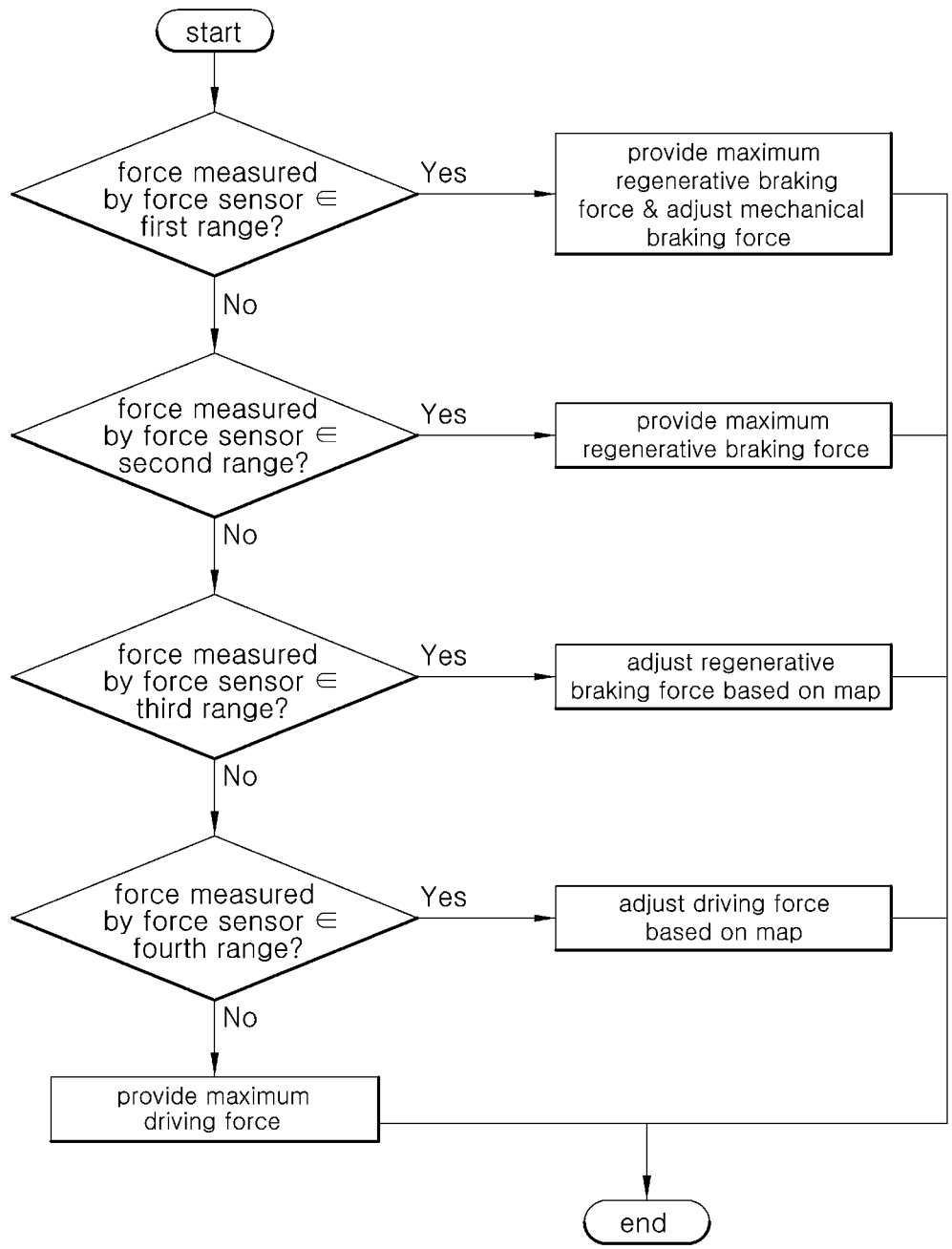
FIG. 3 shows flowchart for describing a control method according to measurement values of a force sensor in each mode of FIG. 2.

In the operation (S20) of controlling the driving force and braking force of the add-on mobility 3, as shown in FIG. 3, when the magnitude of the force in the front-rear direction measured by the force sensor 7 belongs to the first range R1, the mechanical braking force of the braking device 17 is controlled to be provided while the regenerative braking force of the motor 11 is maximally provided, and when the magnitude of the force in the front-rear direction measured by the force sensor 7 belongs to the second range R2, the regenerative braking force of the motor 11 is maximally controlled, and when the magnitude of the force in the front-rear direction measured by the force sensor 7 belongs to the third range R3, the regenerative force of the motor is controlled according to the magnitude of the compressive force.

Here, the third range R3 is set to a range of a compressive force having a level at which an appropriate connection state may be maintained without providing an excessive compressive force to the main body vehicle 1 with only the regenerative braking force of the motor 11 mounted on the add-on mobility 3, and the regenerative braking force of the motor 11 is generated according to the magnitude of the compressive force measured by the force sensor 7 as described above so that the appropriate connection state is formed between the main body vehicle 1 and the add-on mobility 3.

For reference, in FIG. 3, the regenerative braking force is controlled by a map according to the magnitude of the compressive force.

For reference, the appropriate connection state between the main body vehicle 1 and the add-on mobility 3 means a state in which deformation or damage does not occur between the main body vehicle 1 and the add-on mobility 3 due to an excessive compressive force or tensile force.

When the regenerative braking force of the motor 11 is maximally controlled, the second range R2 is set to a range in which the appropriate connection state between the main body vehicle 1 and the add-on mobility 3 may be maintained.

The first range R1 is a range in which the compressive force between the main body vehicle 1 and the add-on mobility 3 is so excessive with only the regenerative braking force of the motor 11, and in this case, the mechanical braking force by the braking device 17 is generated in addition to maximally providing the regenerative braking force of the motor 11 so that the appropriate connection relationship between the main body vehicle 1 and the add-on mobility 3 may be maintained.

Therefore, as the compressive force measured by the force sensor 7 increases in the first range R1, the mechanical braking force of the braking device 17 may also be controlled to proportionally increase.

Meanwhile, when the magnitude of the force in the front-rear direction measured by the force sensor 7 belongs to the fourth range R4, the driving force of the motor 11 is controlled according to the magnitude of the tensile force, and when the magnitude of the force in the front-rear direction measured by the force sensor 7 belongs to the fifth range R5, the driving force of the motor 11 is maximally controlled.

In other words, in the fourth range R4, the tensile force detected by the force sensor 7 is controlled to decrease with the driving force of the motor 11 of the add-on mobility 3, and the driving force of the motor 11 also increases as the tensile force increases so that an excessively large tensile force does not act between the main body vehicle 1 and the add-on mobility 3.

For reference, FIG. 3 shows that the driving force of the motor 11 is controlled based on the map according to the magnitude of the tensile force in the fourth range R4.

In the fifth range R5, the driving force of the motor 11 is maximally controlled so that the tensile force between the main body vehicle 1 and the add-on mobility 3 may be reduced as possible.

Figure 2:
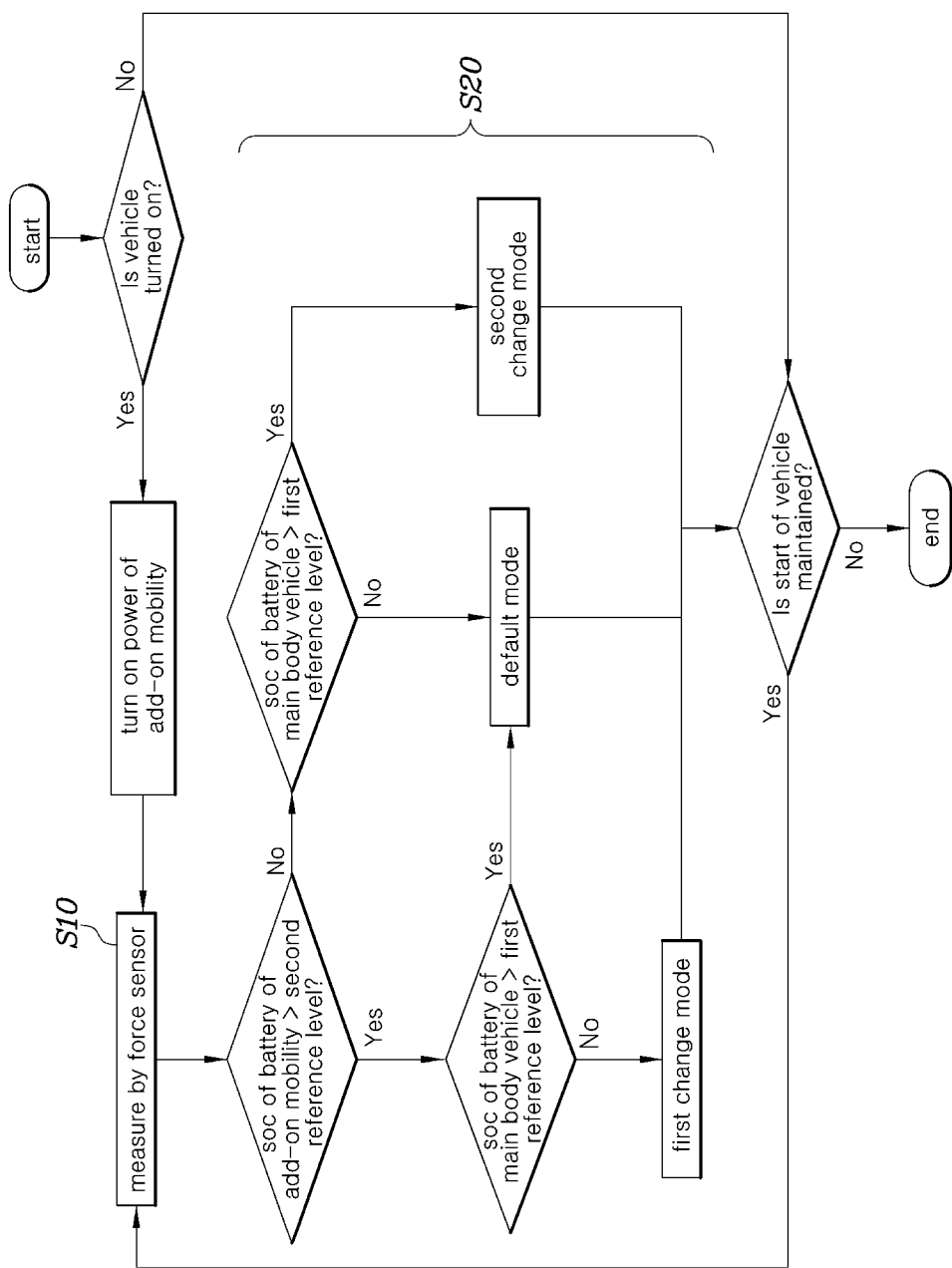
FIG. 2 shows a flowchart for a method of controlling an add-on mobility according to the present disclosure.

Referring to FIG. 2, the controller 15 drives the add-on mobility 3 in different three modes according to the remaining fuel state of the main body vehicle 1 and the SOC of the battery mounted on the add-on mobility 3.

Figure 5:
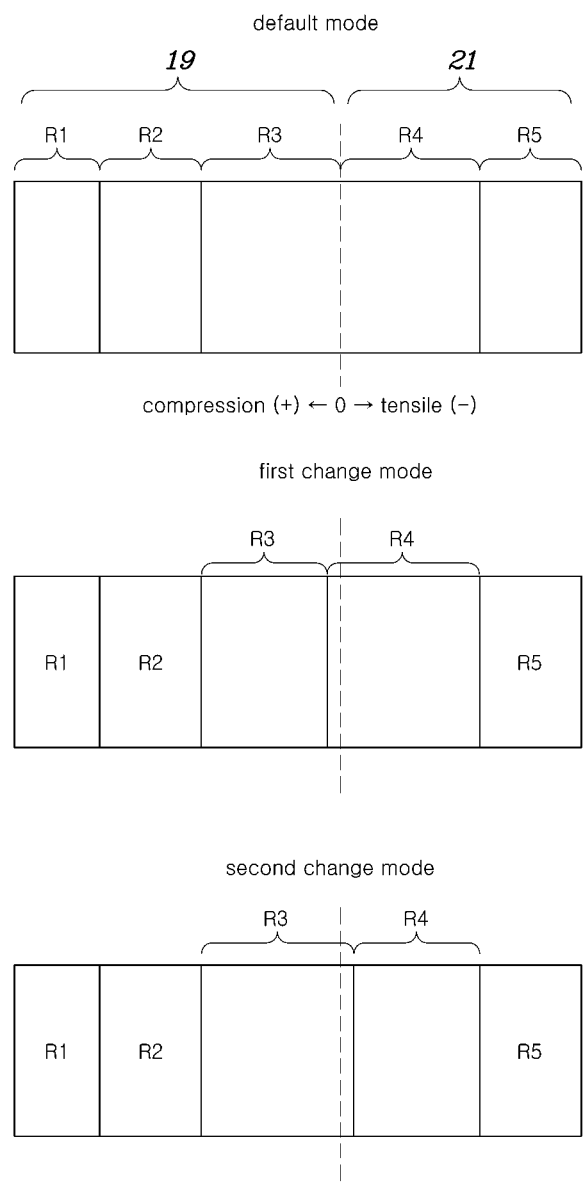
FIG. 5 shows range set states of a reference mode, a first change mode, and a second change mode in the present disclosure.

As shown in FIG. 5, the three modes include a default mode in which the third range R3 and the fourth range R4 are classified at a point where the force in the front-rear direction acting between the main body vehicle 1 and the add-on mobility 3 is zero, a first change mode in which the third range R3 is reduced in the default mode, and the fourth range R4 extends toward the third range R3 by a level at which the third range R3 is reduced, and a second change mode in which the fourth range R4 is reduced in the default mode, and the third range R3 extends toward the fourth range R4 by a level at which the fourth range R4 is reduced.

The controller 15 controls the add-on mobility 3 in the default mode when the remaining fuel state of the main body vehicle 1 is normal in excess of a predetermined first reference level and the SOC of the battery mounted on the add-on mobility 3 is normal in excess of a predetermined second reference level.

In addition, the controller 15 controls the add-on mobility 3 in the first change mode when the remaining fuel state of the main body vehicle 1 is a low state of being the first reference level or less and the SOC of the battery mounted on the add-on mobility 3 is a normal state of exceeding the second reference level.

In this case, since the third range R3 is reduced and the fourth range R4 extends and thus a range in which the regenerative braking force of the add-on mobility 3 is adjusted is reduced and a range in which the driving force is adjusted extends, it is possible to form a state in which the add-on mobility 3 assists an output of the main body vehicle 1 somewhat, thereby improving fuel efficiency or energy efficiency of the main body vehicle 1 and lengthily extending a distance to empty (DTE).

In addition, the controller 15 controls the add-on mobility 3 in the second change mode when the remaining fuel state of the main body vehicle 1 is a normal state in excess of the predetermined first reference level and the SOC of the battery mounted on the add-on mobility 3 is a low state of being the second reference level or less.

In this case, since the fourth range R4 is reduced and the third range R3 extends and thus the range in which the driving force of the add-on mobility 3 is reduced and the range in which the regenerative braking force is adjusted is reduced, it is possible to reduce the amount of usage energy of the add-on mobility 3.

Therefore, the combination vehicle 5 can manage and operate the energy more efficiently through the control described above, thereby improving fuel efficiency or energy efficiency of the combination vehicle 5 and maximizing the DTE.

In other words, in the present disclosure, the controller 15 changes ranges of the plurality of ranges according to the remaining fuel state of the main body vehicle 1 and the SOC of the battery mounted on the add-on mobility 3 and differently constitutes combinations in which the driving force and regenerative braking force of the motor 11 mounted on the add-on mobility 3 and the mechanical braking force of the braking device 17 are provided according to the ranges, thereby improving fuel efficiency and energy efficiency of the combination vehicle 5 and maximizing the DTE.

Meanwhile, the controller 15 may change ranges of at least some ranges among the first range R1 to the fifth range R5 according to the remaining fuel state of the main body vehicle 1 and the SOC of the battery mounted on the add-on mobility 3.

The controller 15 may reduce the range of the third range R3 and extend the range of the fourth range R4 by a level at which the range of the third range R3 is reduced when the remaining fuel state of the main body vehicle 1 is a low state of being the predetermined first reference level and the SOC of the battery mounted on the add-on mobility 3 is in a normal state in excess of the predetermined second reference level.

In addition, the controller 15 may reduce the range of the fourth range R4 and extend the range of the third range R3 by a level at which the range of the fourth range R4 is reduced when the remaining fuel state of the main body vehicle 1 is a normal state in excess of the predetermined first reference level and the SOC of the battery mounted on the add-on mobility 3 is a low state of being the predetermined second reference level or less.

Here, the first reference level and the second reference level are the terms commonly used in the present disclosure, and the first reference level indicates the remaining fuel state of the main body vehicle 1 in which whether the assistance for the output of the main body vehicle 1 with the driving force of the add-on mobility 3 by reducing the third range R3 and extending the fourth range R4 as described above is advantageous or disadvantageous in terms of the fuel efficiency or DTE of the combination vehicle 5 may be determined and may be determined by design by a number of experiments and analyses.

In addition, the second reference level indicates the SOC of the battery mounted on the add-on mobility 3 in which whether the decrease in the generation of the driving force of the add-on mobility 3 and the increase in the energy recovery by the regenerative braking by reducing the fourth range R4 and extending the third range R3 as described above are advantageous in terms of the fuel efficiency or DTE of the combination vehicle 5 may be determined and may also be preferably determined by design by a number of experiments and analyses.

Although the present disclosure has been shown and described with reference to specific embodiments, it will be obvious to those skilled in the art that the present disclosure may be variously improved and changed without departing from the technical spirit of the present disclosure provided by the appended claims.

What is claimed is:

1. A method of controlling an add-on mobility, the method comprising:
    measuring a force in a front-rear direction, the force acting between a main body vehicle and the add-on mobility, wherein the force is measured by a force sensor connecting the main body vehicle and the add-on mobility; and
    controlling a driving force and a braking force of the add-on mobility according to a magnitude of the force in the front-rear direction measured by the force sensor, wherein controlling the driving force and the braking force of the add-on mobility comprises controlling a driving force of a motor mounted on the add-on mobility and a mechanical braking force of a braking device, wherein the driving force of the motor and the mechanical braking force are controlled according to a plurality of ranges classified according to the magnitude of the force in the front-rear direction measured by the force sensor, and wherein the plurality of ranges comprise:
    a compressive range in which a compressive force in a front-rear direction acts between the main body vehicle and the add-on mobility, wherein the compressive range is divided into three ranges according to a magnitude of the compressive force and classified into a first range having the greatest compressive force, a third range having the smallest compressive force, and a second range between the first range and the third range; and
    a tensile range in which a tensile force in the front-rear direction acts between the main body vehicle and the add-on mobility, wherein the tensile range is divided into two ranges according to a magnitude of the tensile force and classified into a fourth range having a tensile force smaller than the third range and a fifth range having a tensile force smaller than the fourth range.

2. The method of claim 1, wherein in controlling the driving force and the braking force of the add-on mobility,
    the mechanical braking force of the braking device is provided while maximally providing a regenerative braking force of the motor when the magnitude of the force in the front-rear direction measured by the force sensor is in the first range,
    the regenerative braking force of the motor is maximally controlled when the magnitude of the force in the front-rear direction measured by the force sensor is in the second range,
    the regenerative braking force of the motor is controlled according to the magnitude of the compressive force when the magnitude of the force in the front-rear direction measured by the force sensor is in the third range,
    the driving force of the motor is controlled according to the magnitude of the tensile force when the magnitude of the force in the front-rear direction measured by the force sensor is in the fourth range, and
    the driving force of the motor is maximally controlled when the magnitude of the force in the front-rear direction measured by the force sensor is in the fifth range.

3. The method of claim 2, further comprising changing ranges among the first range to the fifth range according to a remaining fuel state of the main body vehicle and a state of charge (SOC) of a battery mounted on the add-on mobility.

4. The method of claim 3, wherein changing the ranges comprises reducing the third range and extending the fourth range by a corresponding amount when the remaining fuel state of the main body vehicle is a low state that is less than a first reference level and the SOC of the battery mounted on the add-on mobility is a normal state that is greater than a predetermined second reference level.

5. The method of claim 3, wherein changing the ranges comprises reducing the fourth range and extending the third range by a corresponding amount when the remaining fuel state of the main body vehicle is a normal state that is greater than a predetermined first reference level and the SOC of the battery mounted on the add-on mobility is a low state that is less than a second reference level.

6. The method of claim 2, wherein the add-on mobility is driven in three modes according to a remaining fuel state of the main body vehicle and an SOC of a battery mounted on the add-on mobility.

7. The method of claim 6, wherein the three modes comprise:
    a default mode in which the third range and the fourth range are classified at a point where the force in the front-rear direction acting between the main body vehicle and the add-on mobility is zero;
    a first change mode in which the third range is reduced in the default mode and the fourth range proportionally extends toward the third range; and
    a second change mode in which the fourth range is reduced in the default mode and the third range proportionally extends toward the fourth range.

8. The method of claim 7, wherein the add-on mobility is driven in the default mode when the remaining fuel state of the main body vehicle is a normal state that is greater than a predetermined first reference level and an SOC of a battery mounted on the add-on mobility is normal and in excess of a predetermined second reference level.

9. The method of claim 8, wherein the add-on mobility is driven in the first change mode when the remaining fuel state of the main body vehicle is a low state that is less than the first reference level and the SOC of the battery mounted on the add-on mobility is in a normal state that is greater than the second reference level.

10. The method of claim 8, wherein the add-on mobility is driven in the second change mode when the remaining fuel state of the main body vehicle is a normal state that is greater than the first reference level and the SOC of the battery mounted on the add-on mobility is a low state that is less than the second reference level.

11. The method of claim 1, wherein the plurality of ranges are continuously connected and a range of the plurality of ranges changes according to a remaining fuel state of the main body vehicle and a state of charge (SOC) of a battery mounted on the add-on mobility.

12. A method of controlling an add-on mobility, the method comprising:
    measuring a force in a front-rear direction, the force acting between a main body vehicle and the add-on mobility, wherein the force is measured by a force sensor connecting the main body vehicle and the add-on mobility; and
    controlling a driving force of a motor mounted on the add-on mobility and a mechanical braking force of a braking device, wherein the driving force of the motor and the mechanical braking force are controlled according to a plurality of ranges classified according to a magnitude of the force in the front-rear direction measured by the force sensor and being selected according to a remaining fuel state of the main body vehicle and a state of charge (SOC) of a battery mounted on the add-on mobility.

13. The method of claim 12, wherein the plurality of ranges comprise:
- a compressive range in which a compressive force in a front-rear direction acts between the main body vehicle and the add-on mobility, wherein the compressive range is divided into three ranges according to a magnitude of the compressive force and classified into a first range having the greatest compressive force, a third range having the smallest compressive force, and a second range between the first range and the third range; and
- a tensile range in which a tensile force in the front-rear direction acts between the main body vehicle and the add-on mobility, wherein the tensile range is divided into two ranges according to a magnitude of the tensile force and classified into a fourth range having a tensile force smaller than the third range and a fifth range having a tensile force smaller than the fourth range.

14. The method of claim 13, wherein in controlling the driving force and the braking force of the add-on mobility,
- the mechanical braking force of the braking device is provided while maximally providing a regenerative braking force of the motor when the magnitude of the force in the front-rear direction measured by the force sensor is in the first range,
- the regenerative braking force of the motor is maximally controlled when the magnitude of the force in the front-rear direction measured by the force sensor is in the second range,
- the regenerative braking force of the motor is controlled according to the magnitude of the compressive force when the magnitude of the force in the front-rear direction measured by the force sensor is in the third range,
- the driving force of the motor is controlled according to the magnitude of the tensile force when the magnitude of the force in the front-rear direction measured by the force sensor is in the fourth range, and
- the driving force of the motor is maximally controlled when the magnitude of the force in the front-rear direction measured by the force sensor is in the fifth range.

15. The method of claim 13, wherein in controlling the driving force and the braking force of the add-on mobility,
- the mechanical braking force of the braking device is provided while maximally providing a regenerative braking force of the motor when the magnitude of the force in the front-rear direction measured by the force sensor is in the first range,
- the regenerative braking force of the motor is maximally controlled when the magnitude of the force in the front-rear direction measured by the force sensor is in the second range,
- the regenerative braking force of the motor is controlled according to the magnitude of the compressive force when the magnitude of the force in the front-rear direction measured by the force sensor is in the third range,
- the driving force of the motor is controlled according to the magnitude of the tensile force when the magnitude of the force in the front-rear direction measured by the force sensor is in the fourth range, and
- the driving force of the motor is maximally controlled when the magnitude of the force in the front-rear direction measured by the force sensor is in the fifth range.

16. The method of claim 15, further comprising changing ranges among the first range to the fifth range according to a remaining fuel state of the main body vehicle and a state of charge (SOC) of a battery mounted on the add-on mobility.

17. The method of claim 16, wherein changing the ranges comprises reducing the third range and extending the fourth range by a corresponding amount when the remaining fuel state of the main body vehicle is a low state that is less than a first reference level and the SOC of the battery mounted on the add-on mobility is a normal state that is greater than a predetermined second reference level.

18. The method of claim 16, wherein changing the ranges comprises reducing the fourth range and extending the third range by a corresponding amount when the remaining fuel state of the main body vehicle is a normal state that is greater than a predetermined first reference level and the SOC of the battery mounted on the add-on mobility is a low state that is less than a second reference level.

19. The method of claim 15, wherein the add-on mobility is driven in three modes according to a remaining fuel state of the main body vehicle and an SOC of a battery mounted on the add-on mobility.

20. An apparatus comprising:
- a force sensor configured to measure a force in a front-rear direction, the force acting between a main body vehicle and an add-on mobility, wherein the force sensor connects the main body vehicle and the add-on mobility; and
- a controller configured to control a driving force and a braking force of the add-on mobility according to a magnitude of the force in the front-rear direction measured by the force sensor; wherein the controller is configured to control the driving force and the braking force of the add-on mobility by controlling a driving force of a motor mounted on the add-on mobility and a mechanical braking force of a braking device, wherein the driving force of the motor and the mechanical braking force are controlled according to a plurality of ranges classified according to the magnitude of the force in the front-rear direction measured by the force sensor, and wherein the plurality of ranges comprise:
  - a compressive range in which a compressive force in a front-rear direction acts between the main body vehicle and the add-on mobility, wherein the compressive range is divided into three ranges according to a magnitude of the compressive force and classified into a first range having the greatest compressive force, a third range having the smallest compressive force, and a second range between the first range and the third range; and
  - a tensile range in which a tensile force in the front-rear direction acts between the main body vehicle and the add-on mobility, wherein the tensile range is divided into two ranges according to a magnitude of the tensile force and classified into a fourth range having a tensile force smaller than the third range and a fifth range having a tensile force smaller than the fourth range.

* * * * *